US009654286B2

(12) United States Patent
Yann et al.

(10) Patent No.: US 9,654,286 B2
(45) Date of Patent: May 16, 2017

(54) CONTENT GATHERING USING SHARED KEY

(71) Applicant: Microsoft Technology Licensing, LLC, Redmond, WA (US)

(72) Inventors: Trevor Douglas Yann, Rowville (AU); Moshe Blank, Binyamian (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 147 days.

(21) Appl. No.: 14/046,800

(22) Filed: Oct. 4, 2013

(65) Prior Publication Data

US 2015/0100781 A1   Apr. 9, 2015

(51) Int. Cl.
  *H04L 9/08* (2006.01)
  *G06F 21/62* (2013.01)
(52) U.S. Cl.
  CPC ............ *H04L 9/085* (2013.01); *G06F 21/62* (2013.01); *H04L 9/0891* (2013.01)
(58) Field of Classification Search
  CPC ........ H04L 9/085; H04L 9/0891; G06F 21/62
  See application file for complete search history.

(56) References Cited

U.S. PATENT DOCUMENTS

| 7,277,950 | B1 | 10/2007 | Chapweske |
| 8,997,179 | B2* | 3/2015 | Kruglick ............................ 726/3 |
| 2004/0117649 | A1* | 6/2004 | Whyte ............................ 713/200 |
| 2006/0089936 | A1 | 4/2006 | Chalker |
| 2006/0140134 | A1 | 6/2006 | O'Brien et al. |
| 2008/0126357 | A1* | 5/2008 | Casanova et al. ............... 707/10 |
| 2008/0154851 | A1 | 6/2008 | Jean |
| 2008/0279372 | A1* | 11/2008 | Farrugia et al. ................ 380/45 |
| 2009/0067424 | A1* | 3/2009 | Zhang et al. .................. 370/389 |
| 2009/0210697 | A1 | 8/2009 | Chen et al. |
| 2010/0088269 | A1* | 4/2010 | Buller et al. ................... 707/609 |
| 2010/0211608 | A1* | 8/2010 | Dolganow et al. ............ 707/803 |
| 2010/0293097 | A1* | 11/2010 | Pomeroy ......................... 705/58 |
| 2011/0125849 | A1 | 5/2011 | Boyd et al. |

OTHER PUBLICATIONS

Zheng et al., "Reusing shares in Secret Sharing Schemes", 1994, pp. 199-205   http://ro.uow.edu.au/cgi/viewcontent.cgi?article=2113&context=infopapers.*

(Continued)

*Primary Examiner* — Robert Leung
*Assistant Examiner* — Carlos M De Jesus Lassala
(74) *Attorney, Agent, or Firm* — Workman Nydegger

(57) ABSTRACT

The gathering of content (such as a file) from a variety of different sources. Rather than provide the whole content, a given one of the sources instead provides only a portion of the information represented by the content. The source also provides a share of, but not the entirety of, the shared secret that will be used to decode. For instance, in one embodiment, the source might encode only a portion of the content using the shared key, and then transmit the encoded portion. As an alternative, the source might encode the entire content, and then transmit a portion of that encoded content. Thus, the transmitter has security with their private content, while still allowing widely available content to be transferred for the benefit of the greater whole.

19 Claims, 6 Drawing Sheets

(56) References Cited

OTHER PUBLICATIONS

Gkantsidis, et al., "Network Coding for Large Scale Content Distribution", In 24th Annual Joint Conference of the IEEE Computer and Communications Societies, vol. 4, Mar. 13, 2005, 11 pages.
Gupta, et al., "A Selective Encryption Approach to Fine-Grained Access Control for P2P File Sharing", In 6th International Conference on Collaborative Computing: Networking, Applications and Worksharing, Oct. 9, 2010, 10 pages.
"BitTorrent", Retrieved on: Jun. 11, 2013, Available at: http://en.wikipedia.org/wiki/Bittorrent.
"Erasure Code", Retrieved on: Jun. 11, 2013, Available at: http://en.wikipedia.org/wiki/Erasure_code.

* cited by examiner

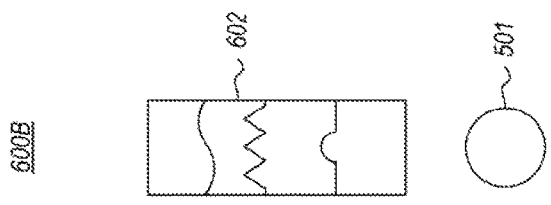
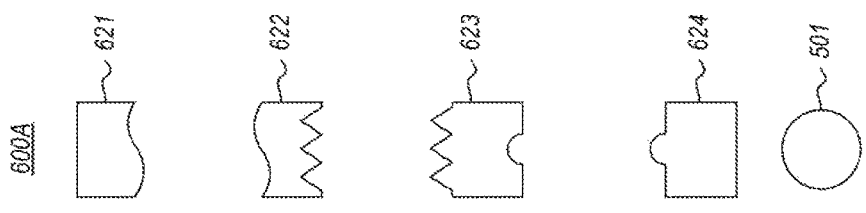
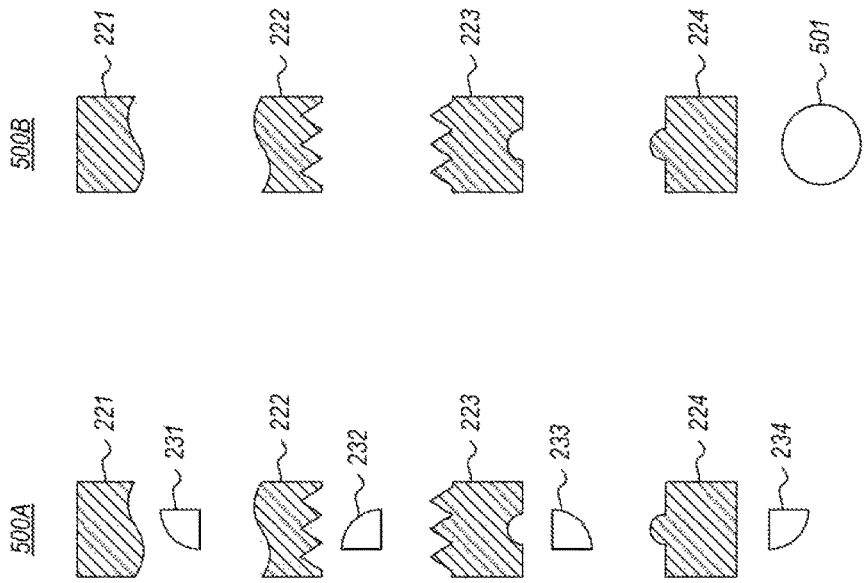

CONTENT GATHERING USING SHARED KEY

BACKGROUND

The information age is characterized by the widespread availability of information made possible through network communication. One common way to exchange information in a network environment is for one node of the network to transmit a file to another node of the network. One problem associated with such file transfer is bandwidth, especially if the transmitting node has limited or expensive bandwidth as compared to the receiver.

At least one conventional solution solves this problem with respect to commonly-available files. The solution is to distribute the transmitting responsibility amongst multiple transmitter nodes such that the transmitting nodes simultaneously each transmit a portion of the file to the receiving node. The receiving node then gathers the various file portions and assembles the file. Such technology is especially useful for large files.

BRIEF SUMMARY

At least some embodiments described herein relate to the gathering of content (such as a file) from a variety of different sources. Rather than provide the whole content, a given one of the sources instead provides only a portion of the information represented by the content. The source also provides a share of, but not the entirety of, the shared secret that will be used to decode. For instance, in one embodiment, the source might encode only a portion of the content using the shared key, and then transmit the encoded portion. As an alternative, the source might encode the entire content, and then transmit a portion of that encoded content.

The share of the shared key is not sufficient alone to decode the encoded content. Rather, one or more other shares of the shared key are to be used formulate the shared key, and thereby decode the content. For instance, a file portion might be encrypted using an encryption key that is derived from the entire file contents (perhaps by being derived from a hash of each of several portions of the file), and be transmitted along with a hash of the file portion. At the receiving side, once the recipient receives enough of the hashes of the file portions, along with the corresponding encoded file portions, each of the encoded file portions may be decoded, and the resultant file constructed.

This gives the transmitter assurance that unless the content they are sharing is widely distributed content already, then the recipient (which could be an eavesdropper) will not be able to access the content, or even the content portion that the transmitter transmitted. Thus, even if the transmitter transmits a portion of a personal document that is isolated to the transmitter, the recipient cannot derive personal information as the document portion cannot be decoded. On the other hand, if the content were, for example, malware, the recipient might gather the malware portions, decode the malware, and perform testing of the malware. Thus, the transmitter has security with their private content, while still allowing widely available content to be transferred for the benefit of the greater whole.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 5A illustrates the state of the received data prior to the formulation of the shared secret, and prior to decoding;

FIG. 5B illustrates the state of the received data after the formulation of the shared secret, and prior to decoding;

FIG. 6A illustrates the state of the received data after decoding the content portions used the shared secret in accordance with a first embodiment;

FIG. 6B illustrates the state of the received data after assembling the content from the decoded content portions in accordance with the first embodiment;

FIG. 7A illustrates the state of the received data after assembling the encoded portions to form the encoded content in accordance with a second embodiment.

DETAILED DESCRIPTION

Figure 1:
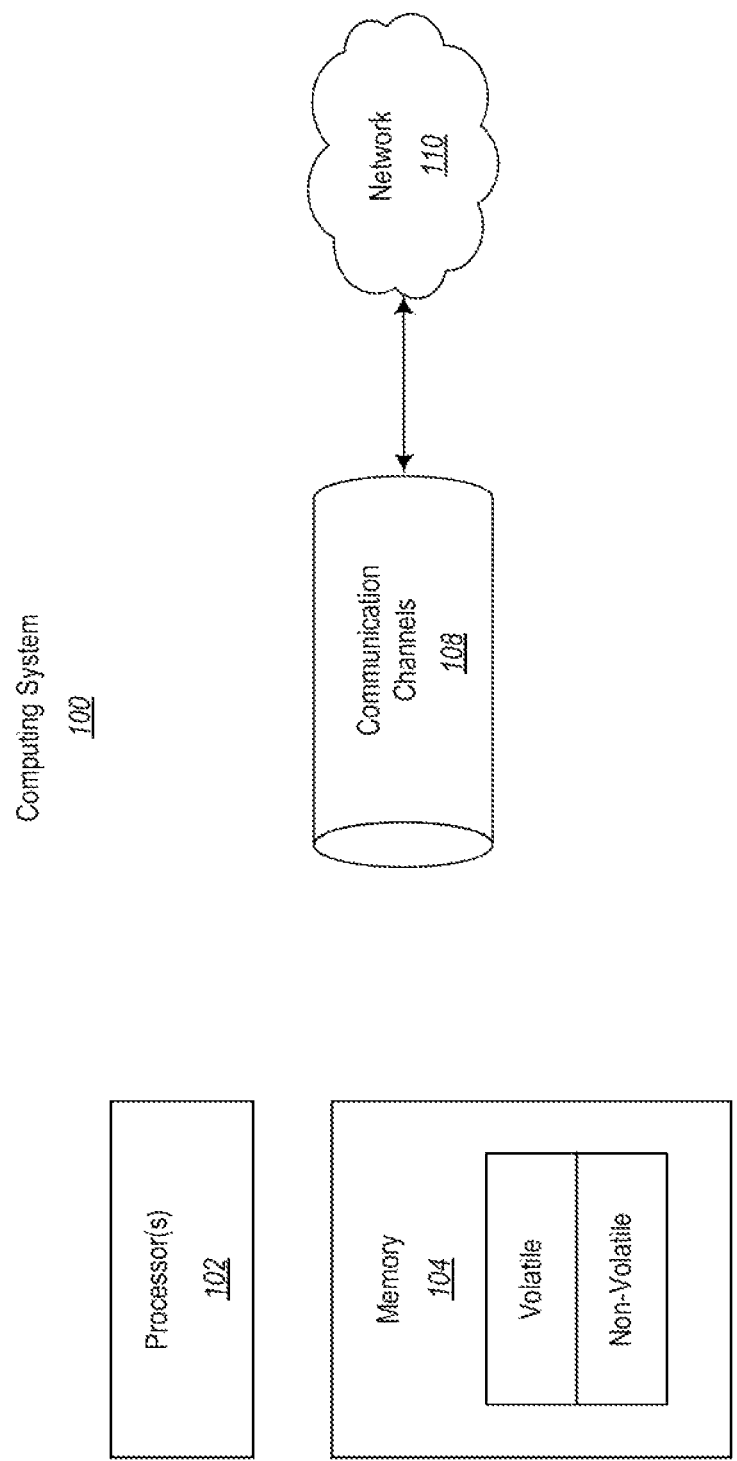
FIG. 1 abstractly illustrates a computing system in which some embodiments described herein may be employed.

At least some embodiments described herein relate to the gathering of content (such as a file) from a variety of different sources. Rather than provide the whole content, a given one of the sources instead provides only a portion of the information represented by the content. The source also provides a share of, but not the entirety of, the shared secret that will be used to decode. For instance, in one embodiment, the source might encode only a portion of the content using the shared key, and then transmit the encoded portion. As an alternative, the source might encode the entire content, and then transmit a portion of that encoded content.

The share of the shared key is not sufficient alone to decode the encoded content. Rather, one or more other shares of the shared key are to be used formulate the shared key, and thereby decode. For instance, a file portion might be encrypted using an encryption key that is derived from the entire file contents (perhaps by being derived from a hash of each of several portions of the file), and be transmitted along with a hash of the file portion. At the receiving side, once the recipient receives enough of the hashes of the file portions, along with the corresponding encoded file portions, each of the encoded file portions may be decoded, and the resultant file constructed.

This gives the transmitter assurance that unless the content they are sharing is widely distributed content already, then the recipient (which could be an eavesdropper) will not be able to access the content, or even the content portion that the transmitter transmitted. Thus, even if the transmitter transmits a portion of a personal document that is isolated to the transmitter, the recipient cannot derive personal information as the document portion is not decoded. On the other hand, if the file were, for example, malware, the recipient might gather the malware portions, decode the malware, and perform testing of the malware. Thus, the transmitter has security with their private content, while still allowing widely available content to be transferred for the benefit of the greater whole.

Some introductory discussion of a computing system will be described with respect to FIG. 1. Then, the secure content gathering operations will be described with respect to subsequent figures.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110. The computing system 100 also includes a display, which may be used to display visual representations to a user.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
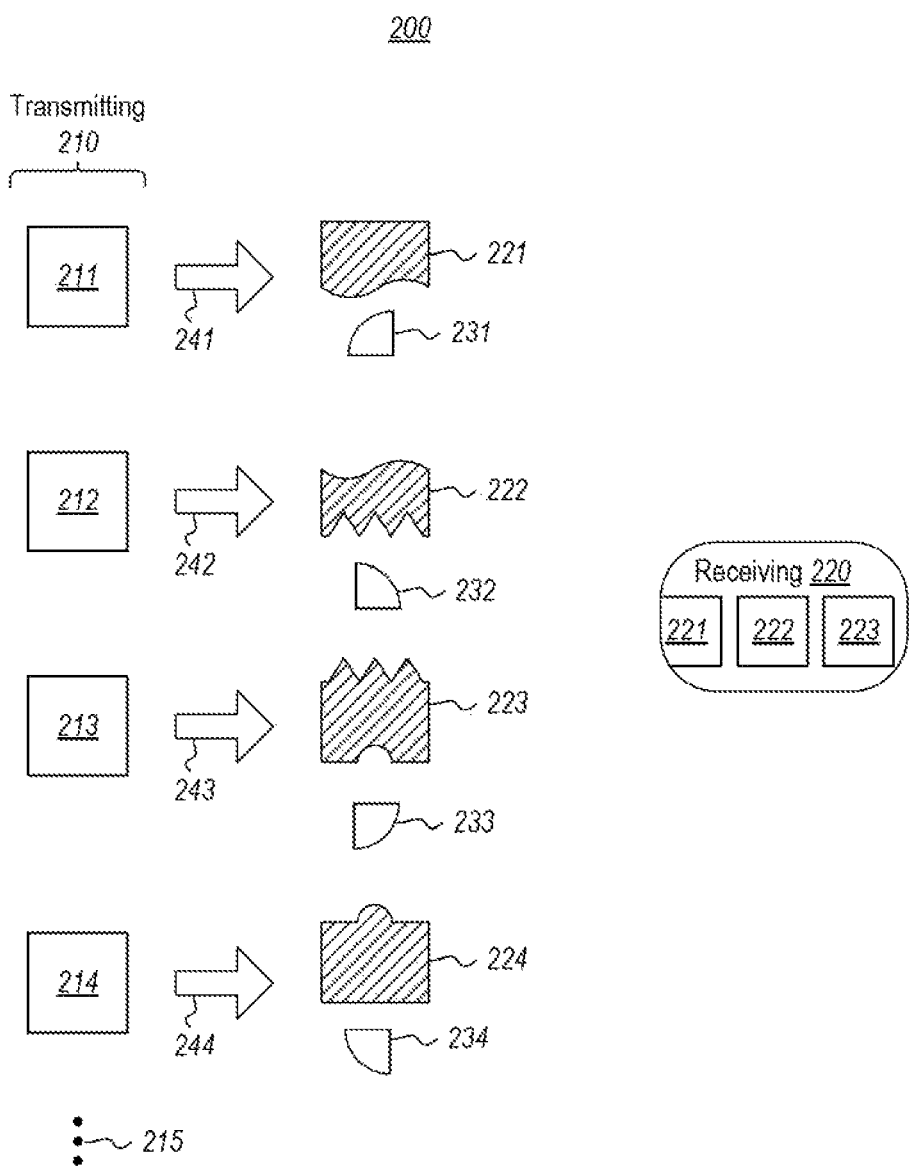
FIG. 2 illustrates a network environment in which the principles described herein may operate, including multiple transmitting nodes that each transmit an encoded content portion and a share of a shared secret, and that also includes a single receiving node.

FIG. 2 illustrates a network environment 200 in which the principles described herein may operate. The network environment 200 includes multiple transmitting nodes 210 and a receiving node 220. The transmitting nodes 210 are illustrated as including four transmitting nodes 211 through 214. However, this is by way of example only. As represented by ellipses 215, there may be any multiple number of transmitting nodes 210 in the network environment.

Each of the transmitting nodes 210 may be structured as described above for the computing system 100 of FIG. 1. The nodes 210 are termed "transmitting" herein in that, in a particular example described herein, they collectively transmit content to the receiving node 220. The term "transmitting" node is not intended to limit the function of the nodes 210 to only transmitting. The transmitting nodes 210 may each receive in other contexts, and may perform a wide variety of functionality attributable to general purpose computing systems.

The receiving node 220 may also be structured as described above for the computing system 100 of FIG. 1. Again, the node 220 is termed "receiving" for the purposes of the example, but this modifier is again not intended to limit the functionality of the node 220 to just receiving. In fact, further functionality is described as being associated with the receiving node 220 in that the receiving node 220 not only includes a receiving module 221, but also a processing module 222, and optionally also a testing module 223.

Figure 3:
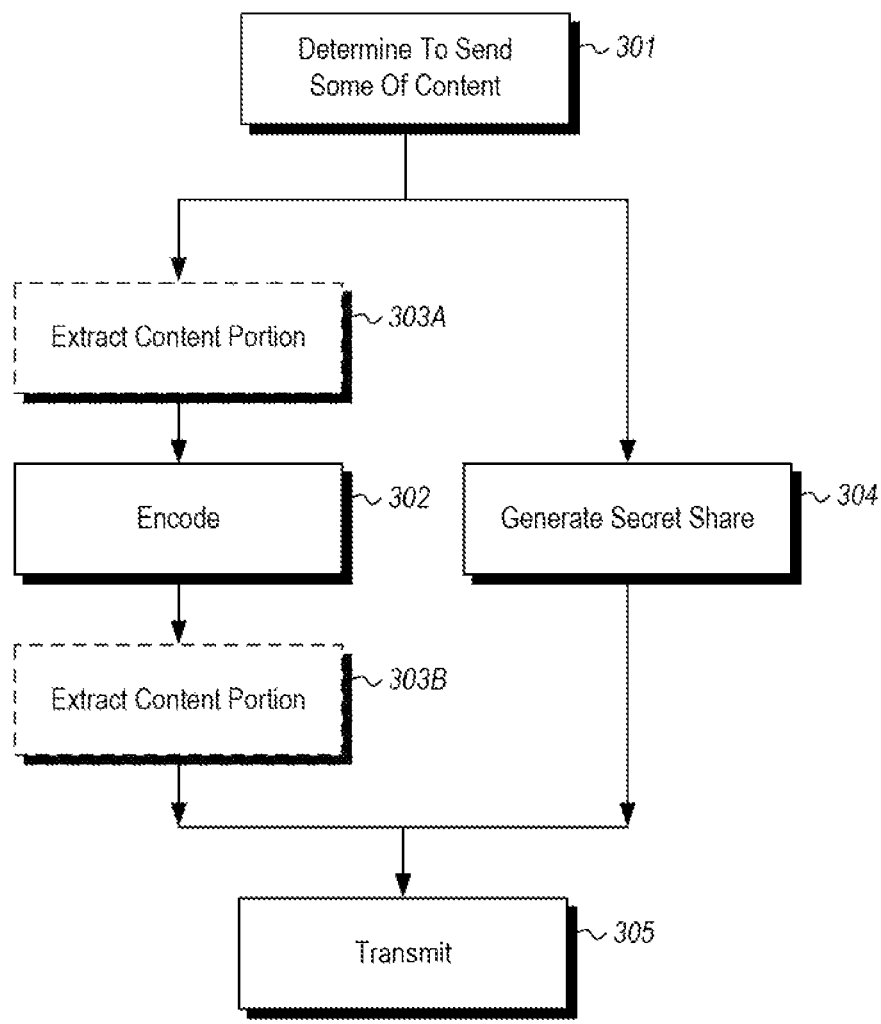
FIG. 3 illustrates a flowchart of a method for assisting in gathering content at a particular network location, which may be performed by any of the transmitting nodes of FIG. 2.

FIG. 3 illustrates a flowchart of a method 300 for assisting in gathering content at a particular network location, the method 300 may be performed by, for instance, any of the transmitting nodes 210 of FIG. 2. In the following example, the content to be transmitted is a file, although the principles described herein might apply to the transfer of any content. For instance, the content might be any correlated data including a stream of data persisted in a storage, memory content, data that was computed or assembled earlier but not persisted, and the like.

The method 300 includes an act of the transmitting node determining that less than all of the file is to be transmitted from the transmitting node to a particular network location (act 301). In the context of FIG. 2, the particular network location that is to receive the file portions is the receiving node 220.

In addition, the transmitting node encodes all or some of the file in a manner that decoding is to be performed using a shared secret (act 302). Furthermore, the portion of the file for transmission is extracted from the file (act 303A and 303B). FIG. 3 actually represents two distinct embodiments. In the first embodiment, the portion of the file for transmission is extracted (act 303A) prior to the encoding operation (act 302). In the second embodiment, the portion of the file for transmission is extracted (act 303B) after the encoding operation (act 302).

In either embodiment, in order to identify which portion is to be extracted from the file (unencrypted in the first embodiment, and encrypted in the second embodiment) for transmission, the transmitting node first determines a schema (or rules) for segmenting the file into portions. However, the transmitting node need not actually segment the file. The schema might, for instance, be dependent on one or more attributes (such as size, type, author, sensitivity, and so forth) of the file. The schema might also depend on instructions provided concurrently or just before determining that a file portion is to be transmitted. For instance, the receiving node 220 might provide instructions as to the schema for segmenting the file into portions.

From this schema, the transmitting node then determines which of the portions to send. The principles described herein are not limited to the mechanism for how the various portions of the file are defined, and how the portion of the file is selected for transmission. However, in one embodiment, the portion is pseudo-randomly selected from amongst all of the portions of the file. In another embodiment, the portion might be identified based on a request that identifies one or more properties of the file portion. For instance, the request might specify the location of the portion within the file and the distribution of the portion within the file. The portion need not be a contiguous portion in any particular address domain, but might include multiple fragments from different address locations. That said, the portion might also be represented by a contiguous address space.

The first embodiment (in which the portion is extracted from the unencoded file) will first be described. Once the portion is identified and extracted (act 303A), the file portion is encoded (act 302). The encoding is performed in a manner that decoding of the portion is to be performed using a shared secret that may be derived from multiple shares of information. Decoding may not be performed based on any one of the shares of information, but multiple shares are to be used to derive the shared key.

As an example only, the shared secret might be a decryption key that is derived from the file contents. In this case, the file portion is encoded by an encryption key that is derived from the file. In one embodiment, the encryption key is generated by identifying all possible portions of the file (using the segmentation schema accessed in act 311), and create a hash (e.g., using the SHA-256 hash algorithm) of each of the portions. The resulting hash values for each portion might then be exclusively-or'ed to given a key that may be used as the AES—encryption key to be used to encode the portion. Thus, the encryption key, and more generally the manner of encoding the portion, is a function of the file contents, and is deterministic given the file contents.

In the second embodiment, the encoding (act 302) is performed before extracting the portion of the file (act 303B) for transmission. Thus, the encoding may be performed as described above, but the encoding is performed on the file as a whole, rather than just the portion of the file. The portion is then extracted from the encoded file (act 303B). Again, the determination of which portion to extract may be similar as described above for the first embodiment, only in the second embodiment, the portion is selected from the encoded file.

In either embodiment, the method also may include generating the share of the shared secret (act 304). For instance, in the above example, a hash of the file portion is generated and used as the share. However, the principles described herein are not limited to encryption and decryption being the shared secret, or a hash of a file portion being the share of the shared secret, but may be applied to any mechanism for sharing secrets in which multiple shares of information are used to derive the shared secret.

A portion of the information represented by the file and the share of the shared secret are then caused to be dispatched to the receiving node (act 305). For instance, in FIG.

2, the transmitting node 211 is illustrated as transmitting (as represented by arrow 241) the encoded portion 221, along with a shared secret 231. Likewise, the transmitting node 212 is illustrated as transmitting (as represented by arrow 242) the encoded portion 222, along with a shared secret 232. Thirdly, the transmitting node 213 is illustrated as transmitting (as represented by arrow 243) the encoded portion 223, along with a shared secret 233. Lastly, the transmitting node 214 is illustrated as transmitting (as represented by arrow 244) the encoded portion 224, along with a shared secret 234. In the first embodiment, the encoded portions 221 through 224 are individually encoded using the shared secret, and thus should be individually decoded before assembly into the file. In the second embodiment, the encoded portion 221 and 224 are pieces of the encoded file, and should thus first be assembled into the encoded file as a whole, prior to decoding the encoded file.

In FIG. 2, the encoding is represented by hash lines within the encoded file portions 221 through 224. The portions 221 through 224 are symbolically of a shape that allows one to be fitted onto another, symbolizing that once decoded, these fragments may be assembled into the entire file in the first embodiment (or in the reverse order in the second embodiment). The shared secrets are each symbolically represented as being a different quartile of a circle, symbolizing that together, they form a circle, which represents the shared secret that may be used to decode any of the file portions.

Figure 4:
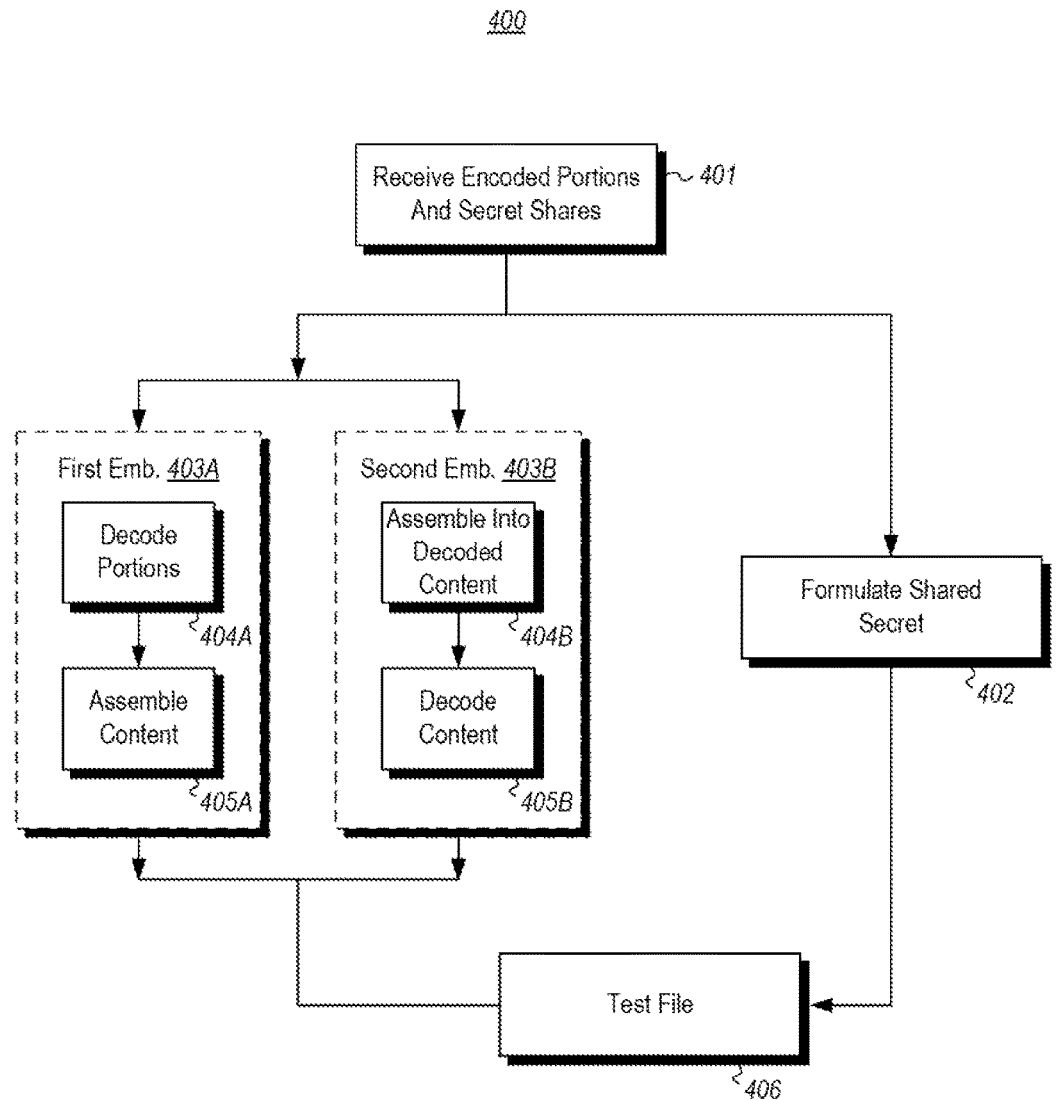
FIG. 4 illustrates a flowchart of a method for gathering content, which may be performed by the receiving node of FIG. 2.

FIG. 4 illustrates a flowchart of a method 400 for gathering a file. As the method 400 may be performed by the receiving node 220 of FIG. 2, the method 400 will be described with frequent reference to FIG. 2 and the example file transmission described therein. The method 400 shows the receiving for both the first embodiment (in which case the acts 404A and 405A within the box 403A are performed) and the second embodiment (in which case the acts 404B and 405B within the box 403B are performed).

For each of the different sources of file portion transmission, the receiving node receives an encoded portion of the file and a share of the share secret (act 401). For instance, in FIG. 2, the receiving node 220 receives the encoded file portions 221 through 224, and the shares 231 through 234 of the secret. FIG. 5A illustrates the state 500A of the received data at this point. All of the file portions 221 through 224 are still encoded (individually encoded in the case of the first embodiment, and portions of the encoded file in the case of the second embodiment), and each of the shares 231 through 234 of the shared secret are not yet assembled to formulate the shared secret. Referring again to FIG. 2, this receiving operation may be performed by the receiving module 221 of the receiving node 220.

The secret shares are then used to construct the shared secret (act 402). FIG. 5B abstractly illustrates the state of the relevant data at this stage of the operation. Note that the quarter circles 231 through 234 are now gathered into a full circle 501, which represents the shared secret. As a concrete example, in each transmission node, suppose that the share of the secret was formulated by constructing a hash of the corresponding file portion that was encoded and transmitted. In that case, perhaps an exclusive OR operation may be performed on all of the hash values to construct a decryption key. Referring again to FIG. 2, this construction of the shared secret may be accomplished using the processing module 222 of the receiving node 220.

Processing is then different depending on which of the first embodiment or the second embodiment is used. In the case of the first embodiment, the shared secret is then used to decode each of at least some of the received encoded portions of the file (act 404A). For instance, in the example, the shared secret 501 may be used to decode all of the encoded portions 221 through 224. In the case of the shared secret 501 being a decryption key, the encrypted portions 221 through 224 may be decrypted. FIG. 6A illustrates the corresponding state 600A, which is similar to the prior state 500B of FIG. 5B, except that the decoded portions 621 through 624 are shown resulting from the decoding of respective encoded portions 221 through 224. The decoded state is symbolized by the decoded file portions 621 through 624 no longer having cross-hatching. Referring to FIG. 2, this decoding might be accomplished by the processing module 222.

At least some of the decoded portions are then used to construct the file (act 405A). For instance, FIG. 6B illustrates the final state 600B in which all of the decoded portions 521 through 524 have been assembled into the file 602. The prior boundaries within the file 602 are represented using solid lines, although this is just for the convenience of understanding that the entire file was constructed from the portions. Referring to FIG. 2, this construction might be accomplished by the processing module 222.

In the case of the second embodiment, the encoded portions are assembled to construct the encoded file (act 404B). For instance, FIG. 7A illustrates the state 700A in which all of the decoded portions 221 through 224 have been assembled into the encoded file 702. Again, the prior boundaries within the file 602 are represented using solid lines, although this is just for the convenience of understanding that the entire file was constructed from the portions. Referring to FIG. 2, this construction might be accomplished by the processing module 222. The file 602 is still shown with hash marking to symbolize that the file is encoded still.

Figure 7B:
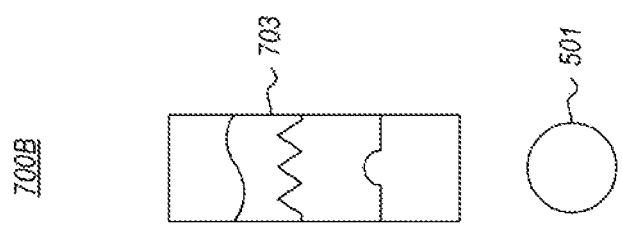
FIG. 7B illustrates the state of the received data after decoding the encoded content in accordance with the second embodiment.
Figure 7B:
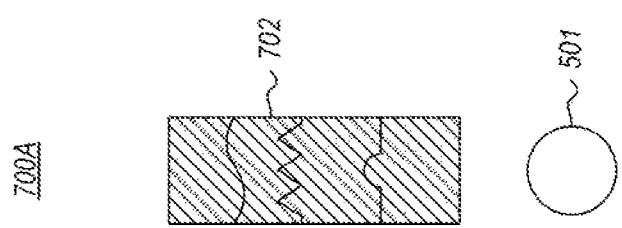

The shared secret is then used to decode the file (act 405B). For instance, in the example, the shared secret 501 may be used to decode the assembled encoded file 702 to thereby form file 703. In the case of the shared secret 501 being a decryption key, the encrypted file 702 may be decrypted. FIG. 7B illustrates the corresponding state 700B, which is similar to the prior state 700A of FIG. 7A, except that the cross hatching has been removed to illustrated that the file 703 is decoded. Note that the state 600B is the same as the state 700B, demonstrating that the first and second embodiments both lead to the same result, that is that the receiving node has received the file.

The file 602 (in the first embodiment) and 703 (in the second embodiment) is as it existed on each of the transmitting nodes 210. Accordingly, the transmitting nodes 210 collectively transmitted the file, but only on the condition that the file 602 was also present on the other transmitting nodes 210 as well. Thus, each transmitting node 210 may operate with the understanding that its private content exclusive to the transmitting node will not be able to be disseminated through this process. Rather, only content that is widely distributed amongst the transmitting nodes will be successfully received. Examples of content that is widely distributed, but which do not have high privacy sensitivity are malware files.

Accordingly, a final optional act in the method 400 includes testing the constructed file for malware properties (act 405). That said, the principles described herein are not limited to the types of content that are transmitted. Referring to FIG. 2, this testing might be accomplished by the testing module 223.

In the embodiment described above in which the file 602 was transmitted, all of the encoded portions and all of the shares of the secret were used to reconstruct the file 602.

However, in some cases, less than all of the content portions and/or less than all of the shares of the secret might be used to reconstruct the content. For instance, at the transmitting side, perhaps one or more of the transmitting nodes transmit redundancy information (such as perhaps an erasure code) for the content portion and/or the secret share. This redundancy information is transmitted to the receiving node, and is used by the receiving node in a manner that less than all of the shares of the secret may be used to reconstruct the shared secret and/or less than all of the content portions may be used to construct the content.

In some cases, the amount of redundancy information transmitted may vary depending on the sensitivity of the content. More highly sensitive files or file types may be subject to less or no redundancy being transmitted, meaning that all of the shares of the shared secret and all of the content portions are to be received before the content may be constructed. Less sensitive content or content types (e.g., file types) may be subject to more redundancy being transmitted, meaning that less than all of the shares of the shares secret and/or less than all of the content portions are to be received before the file can be reconstructed. The former has the benefit of being more secure, but has the downside of slower file construction since reconstruction of the content awaits receipt of all of the shares of the secret and all of the content portions.

Accordingly, a secure mechanism for shared transfer of widely disseminated content has been described. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system, comprising:
   one or more processors; and
   one or more computer-readable hardware storage devices having stored thereon computer-executable instructions that are executable by the one or more processors to configure the computer system to assist in gathering content at a destination computer system, including computer-executable instructions that are executable to configure the computer system to perform at least the following: determine that a particular portion, of a plurality of portions of content of a data item, is to be transmitted from the computer system to a destination computer system; derive a shared secret from two or more of the plurality of portions of the content of the data item using a deterministic function; encode the particular portion using the shared secret, and in a manner that decoding is to be performed using the shared secret; transmit the encoded particular portion towards the destination computer system;
   derive a first share of the shared secret that comprises a first subset of, but not all of, the shared secret; and transmit the first share of the shared secret towards the destination computer system, wherein the first share of the shared secret is usable by the destination computer system to re-construct the shared secret when the first share of the shared secret is combined with at least a second share of the shared secret that comprises a second subset of, but not all of, the shared secret, the second share of the shared secret having been derived by at least one additional computer system from the shared secret in a like manner, and wherein the destination computer system is enabled to decode the encoded portion of the content of data item upon reconstructing the shared secret, and based at least upon receiving the second share of the shared secret from the at least one additional computer system.

2. The computer system in accordance with claim 1, wherein deriving the shared secret from the two or more of the plurality of portions of the content of the data item comprises deriving each of two or more different shares of the shared secret based on each of the two or more of the plurality of portions of the content of the data item, including deriving a particular share, of the two or more different shares of the shared secret, based on the particular portion, and combining the two or more different shares, including the particular share, of the shared secret to derive the shared secret, wherein encoding the particular portion using the shared secret comprises individually encoding the particular portion using the particular share of the shared secret, and wherein the first share of the shared secret that is transmitted towards the destination computer system is the particular share of the shared secret.

3. The computer system in accordance with claim 2, wherein deriving each of the two or more different shares of the shared secret based on each of the two or more of the plurality of portions of the content of the data item comprise hashing each of the two or more of the plurality of portions of the content of the data item, and wherein combining the two or more different shares of the shared secret to derive the shared secret comprises exclusively-or'ing (XOR'ing) each hash to obtain the shared secret.

4. The computer system in accordance with claim 1, wherein deriving the shared secret is performed by deriving two or more different shares of the shared secret using the two or more of the plurality of portions of the content of the data item.

5. The computer system in accordance with claim 4, wherein each share comprises a hash of a corresponding portion of the content of the data item.

6. The computer system in accordance with claim 1, also including computer-executable instructions that are executable to configure the computer system to: transmit redundancy information towards the destination computer system, such that the destination computer system does not need all shares of the shared secret to determine the shared secret.

7. The computer system in accordance with claim 6, wherein the amount of redundancy information transmitted towards the destination computer system is dependent on a sensitivity of the content of the data item.

8. The computer system in accordance with claim 1, wherein the encoded particular portion that is transmitted towards the destination computer system is pseudo-randomly selected.

9. The computer system in accordance with claim 1, wherein deriving the shared secret from the two or more of the plurality of portions of the content of the data item comprises deriving a hash for each of the two or more of the plurality of portions of the content of the data item, each hash comprising one of two or more different shares of the shared secret, and exclusively-or'ing (XOR'ing) each of the hashes to obtain the shared secret.

10. A method, implemented at a computer system that includes one or more processors, for gathering content, the method comprising:
    receiving, from each of a plurality of different sources, a different encoded portion of content of a data item and a different share of a shared secret that is derived from the shared secret, the shared secret having been used by each of the plurality of different sources to encode its corresponding different encoded portion of the content of the data item, the shared secret having been derived from two or more of a plurality of portions of the content of the data item using a deterministic function; formulating the shared secret by combining the received different shares of the shared secret;

decoding each of the received encoded portions of the content of the data item using the formulated shared secret; and constructing the content of the data item by combining the decoded portions of the content of the data item.

11. The method in accordance with claim 10, wherein a number of received shares used to formulate the shared secret is dependent on a sensitivity level of the content of the data item.

12. The method in accordance with claim 10, further comprising: testing the constructed content of the data item for malware properties.

13. The method in accordance with claim 10, further comprising: using redundancy information when decoding each of the received encoded portions of the content of the data item.

14. The method in accordance with claim 10, wherein formulating the shared secret by combining the received different shares of the shared secret comprises exclusively-or'ing (XOR'ing) each of the received different shares of the shared secret.

15. A computer system comprising:
one or more processors; and
one or more computer-readable hardware storage devices having stored thereon computer-executable instructions that are executable by the one or more processors to configure the computer system to assist in gathering content at a destination computer system, including computer-executable instructions that are executable to configure the computer system to perform at least the following: receive, from each of a plurality of different sources, a different encoded portion of content of a data item and a different share of a shared secret that is derived from the shared secret, the shared secret having been used by each a plurality of different sources to encode its corresponding different encoded portion of the content of the data item, the shared secret having been derived from two or more of a plurality of portions of the content of the data item using a deterministic function; formulate the shared secret by combining the received different shares of the shared secret; decode each of the received encoded portions of the content of the data item using the formulated shared secret; and construct the content of the data item by combining the decoded portions of the content of the data item.

16. The computer system in accordance with claim 15, also including computer-executable instructions that are executable to configure the computer system to: test the constructed content of the data item for malware properties.

17. The computer system in accordance with claim 15, wherein a number of received shares used to formulate the shared secret is dependent on a sensitivity level of the content of the data item.

18. The computer system in accordance with claim 15, also including computer-executable instructions that are executable to configure the computer system to: use redundancy information when decoding each of the received encoded portions of the content of the data item.

19. The computer system in accordance with claim 15, wherein formulating the shared secret by combining the received different shares of the shared secret comprises exclusively-or'ing (XOR'ing) each of the received different shares of the shared secret.

* * * * *